Figure 1:
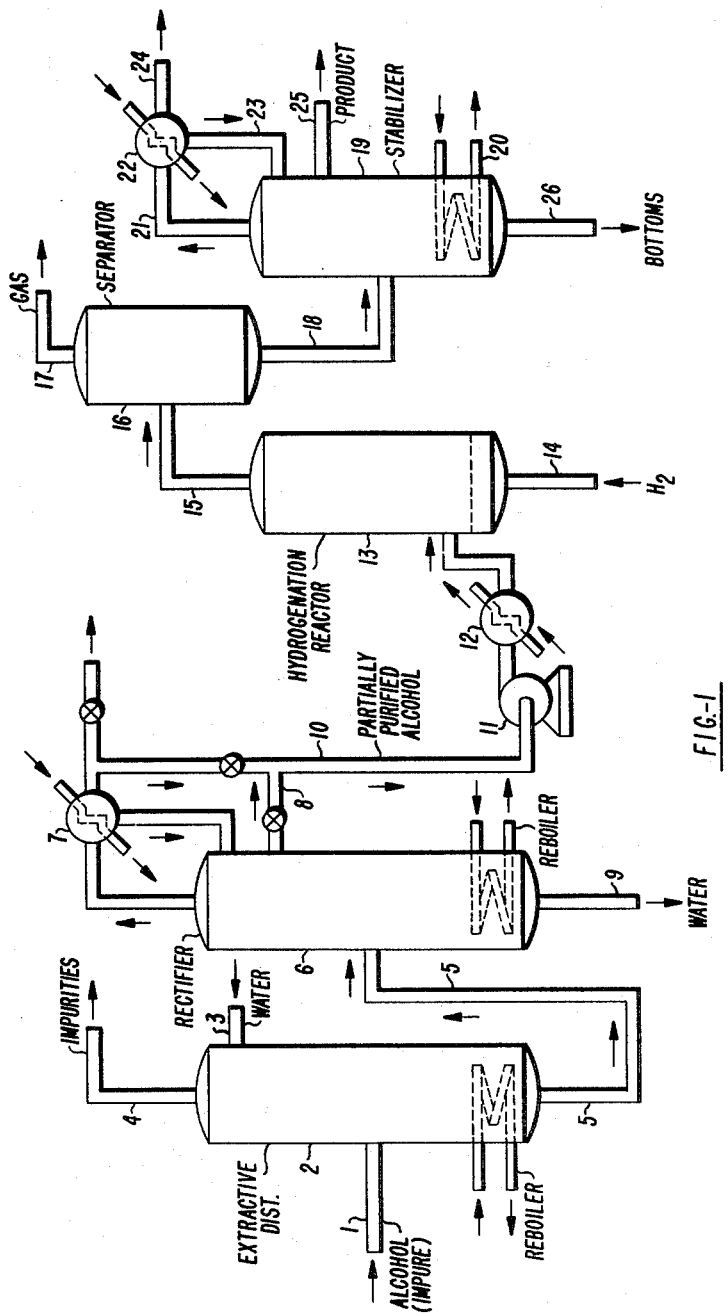

July 5, 1960

E. W. NOMMENSEN ET AL 2,944,087

ALCOHOL HYDROFINISHING

Filed May 16, 1955

3 Sheets-Sheet 1

ERWIN W. NOMMENSEN
EDWARD A. HUNTER
JOSEPH K. MERTZWEILLER
ELAINE T. DELAUNE

INVENTORS

BY  Henry Berk  ATTORNEY

ETHANOL HYDROFINISHING — LABORATORY CONTINUOUS UNIT
RELATIONSHIP BETWEEN M.O.I. INCREASE AND LIQUID FEED RATE

ERWIN W. NOMMENSEN
EDWARD A. HUNTER
JOSEPH K. MERTZWEILER
ELAINE T. DELAUNE
INVENTORS
BY Henry Berk ATTORNEY

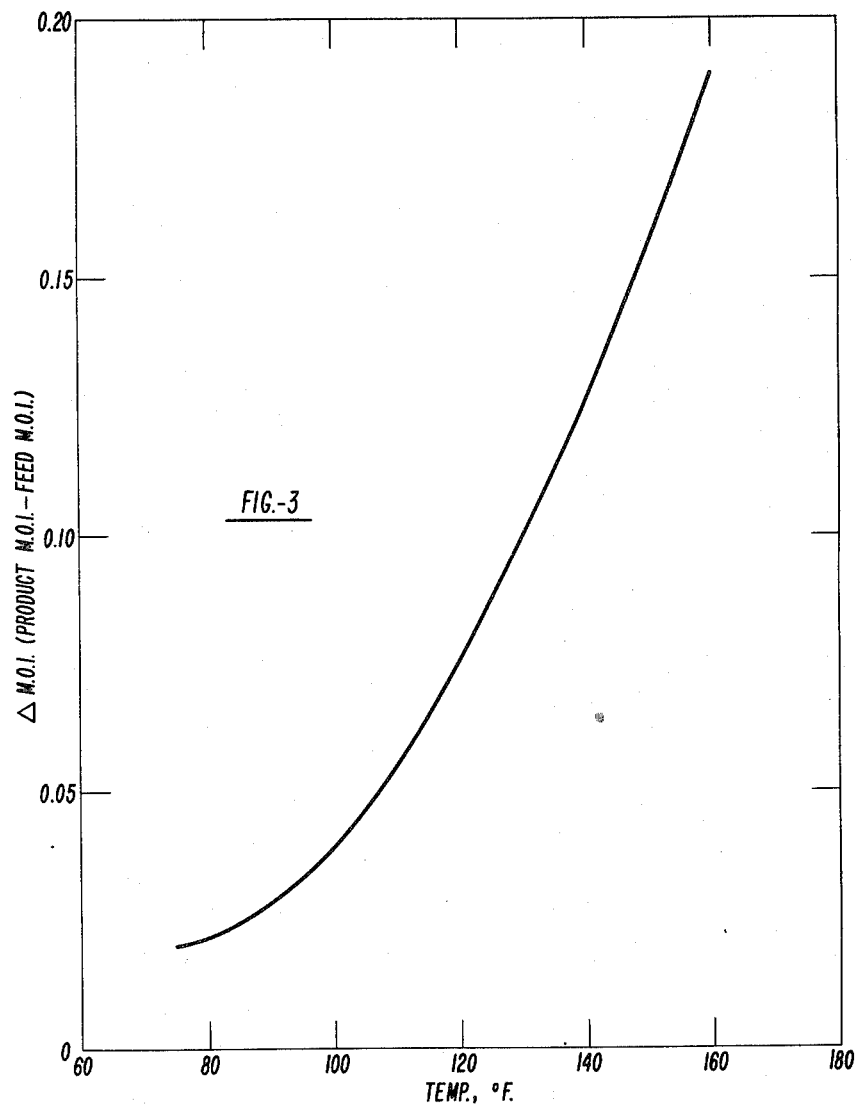

2,944,087
ALCOHOL HYDROFINISHING

Erwin Ward Nommensen, Edward Allen Hunter, Joseph Kern Mertzweiller and Elaine Theodora Delaune, Baton Rouge, La., assignors to Esso Research and Engineering Company, a corporation of Delaware Filed May 16, 1955, Ser. No. 508,604

3 Claims. (Cl. 260—643)

This invention relates to a method of using a mild hydrogenation on slightly impure ethanol, particularly, ethanol synthesized by ethylene hydration and purified by water extractive distillation, for obtaining a final purification.

It is known that in the past methods of refining impure ethyl alcohol or ethanol by hydrogenation have been proposed. Generally, these past methods including hydrogenation or other catalytic treatment were imposed on the crude alcohol containing relatively substantial amounts of impurities and required relatively drastic conditions. The drawbacks of such methods include adverse effects on the preferred sensitive catalysts of the reduced nickel type conversion of the organic impurities to contaminants which remain in the alcohol, conversion of the alcohol to organic impurities which remain in the alcohol, and high expense of the treatment.

The present invention is based on the discovery that improved practical results are obtained if satisfactory conditions (temperature, pressure, and time) are used in the catalytic hydrogenation.

First to enable use of satisfactory mild conditions, the alcohol to be finished should be properly pretreated, preferably by an extractive distillation with water to eliminate all but small or trace amounts of the contaminants which are to be finally reacted by the mild hydrofinishing.

Alcohols finished by conventional (non-extractive) distillation are also subject to great improvement by the mild hydrofinishing technique. The overall effect of the mild hydrofinishing is principally in improving the odor and permanganate time, with little or no change in the content of miscellaneous organic impurities (M.O.I.). The hydrofinished product from conventional distillation generally have higher M.O.I. values than those from extractive distillation. More specifically this invention relates to the general effects of processing conditions to produce a final alcohol having excellent quality as measured in terms of odor, permanganate time and miscellaneous impurities.

The M.O.I. values are determined by optical density by which small variations in the content and type of the miscellaneous organic impurities adequately show up. These values for ethanol to be hydrofinished under satisfactory mild conditions are in the range of 0.015 to 1.0, preferably 0.015 to 0.1.

The highly sensitive M.O.I. test is carried out by mixing the alcohol sample with salicylaldehyde and 98% sulfuric acid, heating the mixture until a yellow color is developed, then measuring the depth of the color with ultra violet spectrophotometer at a certain wave length, e.g. 550 mu. The M.O.I. value is reported as measured optical density. A low M.O.I. is required in a premium grade alcohol.

It should be noted that the alcohol feed suitable for the mild hydrofinishing of the present invention generally can be of widely variable quality with respect to odor and the permanganate time test (P.T.). In general this test is a measure of small quantities of easily oxidized organic impurities, the time being inversely proportional to the concentration of any given impurity. Good quality alcohols have permanganate times of at least 30–40 minutes.

For the P.T. test, 2 cc. of 0.2 g. $KMnO_4$ per liter aqueous solution are added to 50 cc. of the alcohol to be tested, and the time in minutes for the rose color of the mixture at 15° C. to disappear is determined.

It is preferable that the alcohol feed to hydrofinishing have a permanganate time of not less than 20–30 minutes. As indicated by the examples to follow, this is increased to 50–60 minutes. Such an alcohol is readily obtained by the water extractive distillation technique as described in the patent of Drout et al. U.S. 2,638,440, issued May 12, 1953.

The technique of this invention, however, is by no means limited to extractively distilled finished alcohols, but can include conventionally distilled alcohols having very low permanganate time (0–10 minutes), poor odors, and relatively high M.O.I. values.

The odors are measured by a panel of at least 3 members trained in methods of odor evaluation. An odor rating of 2 is assigned to the standard of best odor quality alcohol available. Increasing values represent poorer odors up to scale 12. Alcohols of very poor odor are rated 12+. The odor is a very important consideration in the case of commercial alcohols for certain specific uses. The so-called "prime grades" have odor ratings not greater than class 3.

A flow plan of equipment used for preferred demonstration of the invention is shown in the drawing Figure 1.

Figure 2:
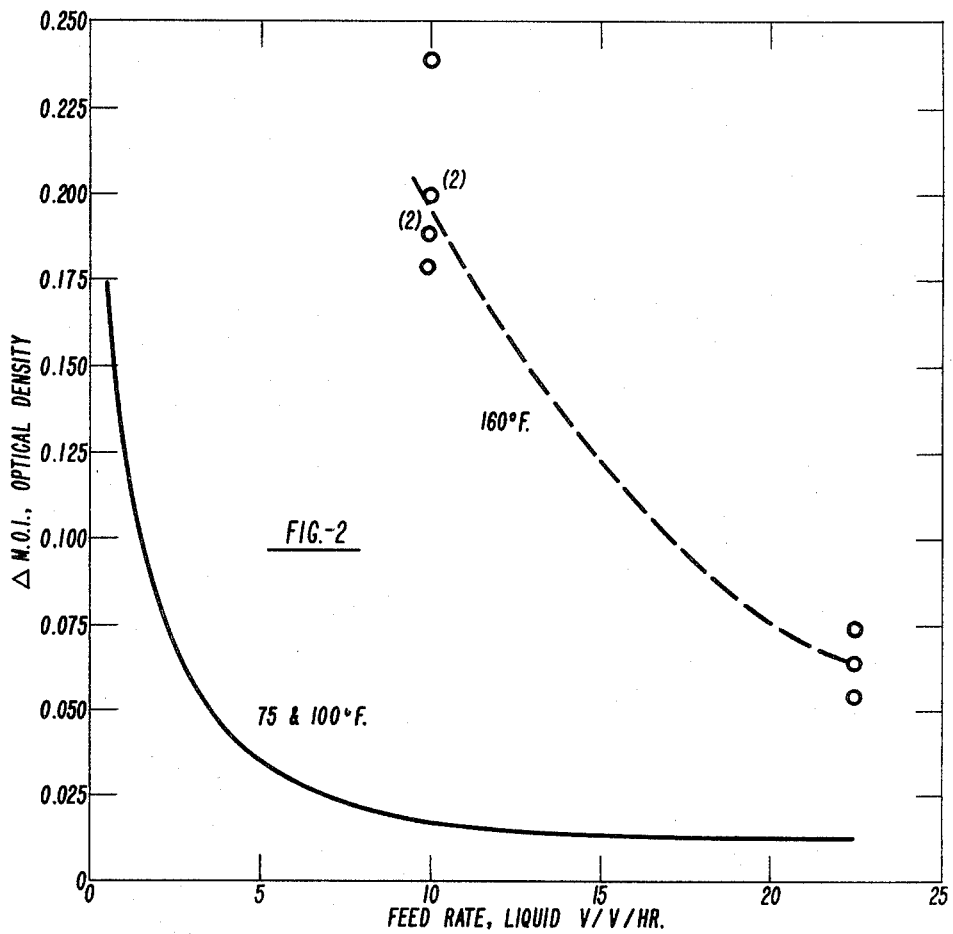

Figure 2 of the drawing shows graphically the effect of feed rate on the M.O.I. values under suitable mild hydrogenation conditions. Figure 3 shows the effect of temperature.

As shown in Figure 1, a crude ethanol stream from ethylene hydration is first given a purification by water extractive distillation in tower 2. Sufficient water is introduced by line 3 at an upper part of tower 2 to give the internal aqueous reflux therein a water content above 65, and preferably 85 to 99 mole percent. With sufficient heat input, under pressures of about 1 to 5 atmospheres, the internal liquid reflux flowing down countercurrent to the vapors in tower 2 is maintained at temperatures above the boiling point of the aqueous alcohol (i.e. above 80° C. and generally between 90 and 100° C.) to cause impurities both lower and much higher boiling than the alcohol to distill overhead through line 4 with larger amounts of water vapor, more than present in aqueous azeotropes. The highly dilute aqueous alcohol freed of all but trace amounts of such impurities is withdrawn and passed by line 5 into rectifying column 6.

In rectifying column 6, the aqueous azeotrope of the alcohol (95% ethanol with 5% water) is distilled to be collected as an overhead product in receiver 7 or removed as an intermediate or side stream fraction 8. Residual water and any high boiling impurities were removed from a lower part of column 6 as by line 9.

The rectified and concentrated liquid alcohol from column 6 can be passed directly to the mild hydrofinishing unit through line 10. A pump 11 and heat exchanger 12 in line 10 may be used for obtaining desired flow rates and temperatures in the alcohol feed to the hydrogenation reactor 13.

Various active hydrogenation catalysts of the reduced nickel type such as "Raney" or supported nickel catalysts can be used for the hydrofinishing, as in reactor 13. The supported catalysts may be on a support, such as kieselguhr (Harshaw type). Similarly active catalysts of the platinum type may be used.

The feed of alcohol for hydrofinishing from line 10 and hydrogen from line 14 are mixed or introduced into the catalyst to form a well mixed liquid-gas mixture which is brought into contact with the solid catalyst. The hydrogen preferably contains less than 0.1% carbon monoxide. The conditions maintained in hydrofinishing reactor 13 determine the quality of the final product. Temperature and liquid feed rate are the most critical variables: temperatures are in the range of 50–160° F., preferably 65°–110° F. Liquid feed rates must be maintained above certain specific limits at any given temperature in order to prevent undesirable increases in M.O.I. values. The limits are here specifically defined in accordance with the examples to follow, but at the preferred temperatures of 65°–110° F., the liquid feed rate should be not less than 2.5 volumes of feed per volume of catalyst per hour and preferably about 5 volumes of feed per volume of catalyst per hour. Pressures very near atmospheric are sufficient to give the desired degree of product quality improvement. Thus pressures in reactor 13 are in the range of 0–50 pounds/sq. inch gauge. The amount of hydrogen in proportion to the liquid feed is not too critical and is generally in the range of 1 to 50 s.c.f./barrel of feed.

The gas and purified alcohol effluent from the reactor 13 is passed by line 15 into a gas separator 16 to disengage and remove hydrogen by line 17. The recovered $H_2$ from line 17 may be recycled to line 14. The hydrofinished alcohol is passed by line 18 into a final gas stripper or stabilizer 19. Heat exchanger 20 may be used in vessel 19 for aiding the stabilization. If desirable the gas separator may be omitted and the excess hydrogen removed from the stabilizer and recycled.

Vapors taken overhead from column 19 through line 21 are cooled in condenser 22 to provide reflux returned by line 23. Uncondensed gaseous material is removed or vented by line 24. Finished alcohol is collected and withdrawn as an intermediate fraction by line 25 or as bottoms withdrawn through line 26.

The qualities of various ethanol feed streams to hydrofinishing were compared. These feeds are represented as follows:

TABLE I

|  | Conventional | E. D. Prime | E. D. Overhead |
|---|---|---|---|
| Odor, Class | 8 to 12+ | 4 to 10 | 12+ |
| P.T. | 0 to 20 | 20 to 45 | About 18 avg. |
| M.O.I. | 0.2 to 1.0 | 0.02 to 0.10 | 0.03 to 0.05 |

Conventional=straight fractionation.
E.D. Prime=upper side stream from extractive distillation rectifier.
E.D. Overhead=overhead distillate extractive distillation rectifier.

Experiments were carried out on treating above types of alcohols by contact with small amounts (0.15 wt. percent) of Raney nickel catalyst under a hydrogen atmosphere at ordinary atmosphere temperatures and pressures (about 50° to 110° F. and 0 to 3 p.s.i.g.) and under more drastic conditions.

*Example 1*

Under the mild conditions (50° to 110° F. and 0 to 3 p.s.i.g.) the odor and P.T. of each type ethanol was markedly improved with no significant or appreciable change in the M.O.I. The maximum amount of hydrogen consumed in any run was 0.03 g. moles/l. alcohol, but it was found unnecessary to use the maximum and some runs were stopped at about one-third the maximum in obtaining the improvement from class 12 to acceptable class 2 odor with increase of P.T. up to 60 minutes from 20 minutes. In one run hydrogen was not added and the quality of the alcohol was degraded evidently due to the formation of unsaturated components by decomposition of the alcohol.

*Example 2*

Under more drastic conditions (200° F. and 100–300 p.s.i.g.; and 200–350° F., 1450–2000 p.s.i.g.) Harshaw nickel catalyst was used on typical production ethanols having P.T. values of 5 to 10 minutes. While in each run there was some improvement in odor and P.T. values of portions, a dependable over-all improvement was not obtained and the best improvement was obtained with the least drastic conditions (200° F., 100 p.s.i.g.) in which 80% of intermediate (10%) cuts of the hydrofinished ethanol were of Grade 1 odor and with P.T. values of above 30.

*Example 3*

Milder conditions (temperatures in the range of 65° to 80° F. and pressures of .05–3 p.s.i.g.) were investigated in an attempt to find conditions under which the supported (Harshaw) nickel catalyst would not cause the undesirable increase in M.O.I. The experiments were carried out batchwise as were those described in Examples 1 and 2.

With the supported catalyst, the same maximum amount of hydrogen was finally consumed as with the unsupported Raney catalyst, but a considerably longer time was required. Odor was improved from Class 8–12 to Class 2, but P. T. was not improved to the extent obtained with Raney nickel. M.O.I. was increased in every experiment in which the P.T. of alcohol was improved. Experiments made varying the time of reaction indicated that the long contact time required to improve odor to the desired level was responsible for the increase in M.O.I. At shorter contact times up to 2.2 hours, the M.O.I. increased little if any, but the odor was improved only from Class 8 to Class 4.

*Example 4*

Continuous operation was investigated to determine whether the desired odor improvement could be obtained with supported (Harshaw) nickel catalyst, without the attendant increase in M.O.I. observed in the batchwise experiments.

The continuous method of operating represented in the flow diagram was devised for obtaining essentially good control of flow rates with supported nickel catalyst (60% reduced nickel on kieselguhr). Typical results from satisfactory controlled mild hydrogenation of side stream prime ethanol from the rectifier of water extractive distillation are summarized in the following Table II.

TABLE II

ETHANOL HYDROFINISHING

[75° F., 1 atm. pressure, 10–20 cu. ft./barrel electrolytic $H_2$.]

|  | Odor Class | Permanganate Time, Min. | M.O.I. |
|---|---|---|---|
| Feed: | 12+ | 42 | 0.025 |
| Flow Rate Products— |  |  |  |
| 7 v./v./hr | 2− | 51 | 0.058 |
| 10 v./v./hr | 2− | 61 | 0.025 |
| 23 v./v./hr | 2− | 57 | 0.032 |
| Feed: | 6 to 8 | 42 | 0.025 |
| Flow Rate Products— |  |  |  |
| 5 v./v./hr | 2− | 69 | 0.025 |
| 10 v./v./hr | 2− | 57 | 0.015 |
| 15 v./v./hr | 2− | 51 | 0.035 |

From a large number of experiments it was found possible to devise graphical relationship as shown in Figures 2 and 3 for ascertaining critical limits of flow rates and hydrofinishing temperatures for satisfactory odor and P.T. improvement without undesirable excessive increase of miscellaneous organic impurities in the alcohol product. These graphs show that the usually highest allowable increase of such impurities M.O.I. of 0.075 is obtained if the liquid alcohol feed rate becomes less than 2.5 volumes per volume of catalyst per hour and if the hydrofinishing temperature rises to above 110° F.

Another factor of importance in using well selected low temperatures, is that the hydrogen used does not have to be extremely pure to prevent nickel carbonyl formation. Methanized hydrogen was successfully used in place of electrolytic hydrogen at temperatures below 110° F.

The data obtained in hydrofinishing at temperatures above 110° F., particularly at 160 and 170° F. indicates that the increase of M.O.I. to above 1.0 is caused by condensation reactions which are favored by contact time and temperature.

The data in Table II shows that mild condition hydrofinishing assures products superior to the class 2 standard with improved P.T. and no appreciable adverse effects on M.O.I. The catalyst was used for 3 months without signs of activity loss. Highest selectivity for odor removal with least increase of M.O.I. was obtained at the higher feed rates of 5 to 23 v./v./hr. There was substantially no alcohol loss and extremely low hydrogen consumption (less than 0.5 s.c.f./b.).

*Example 5*

As shown in the following Table III there can be variations in the kind of odoriferous ethanol used as feed, but there is a point at which the mild hydrofinishing can not be used satisfactorily, i.e. when the alcohol is of the odor class much above 12, a very low P.T., below 10, and an M.O.I. above 1.0. The feeds compared in Table III are:

FEED QUALITY AND SOURCE

A. Extra prime grade—water extractive distillation—rectifier side stream.
B. Prime grade—water extractive distillation—rectifier side stream.
C. High grade—water extractive distillation—rectifier overhead.
D. Good regular grade—conventional fractionation.
E. Poor regular grade—conventional fractionation.

TABLE III

[10 v./v./hr. liquid flow rate of feed alcohol 1 atm. pressure. Electrolytic H₂.]

| Feed | A | B | C | D | E |
|---|---|---|---|---|---|
| Odor | 2 | 6 | 8 | 12 | 12+ |
| P.T. | 57 | 48 | 43 | 31 | 3 |
| M.O.I. | 0.018 | 0.02 | 0.02 | 0.28 | 1.0 |
| Product: | | | | | |
| Odor | 2− | 2− | 2− | 2− | 10 |
| P.T. | 57 | 60 | 55 | 55 | 43 |
| M.O.I. | 0.015 | 0.021 | 0.025 | 0.36 | 1+ |

The hydrofinished product was heated under total reflux to strip out dissolved hydrogen without loss of alcohol at 1 atm. and at 180° F. for about 15 minutes. The thus refluxed (stabilized) alcohol was cooled and analyzed.

TABLE IV

| | M.O.I. | P.T. | Odor |
|---|---|---|---|
| Blank (A) | 0.120 | 49 | 2 |
| Stabilized (A) | 0.023 | 59 | 2 |
| Blank (B) | 0.095 | 56 | 2 |
| Stabilized (B) | 0.013 | 58 | 2 |
| Blank (C) | 0.128 | 56 | 2 |
| Stabilized (C) | 0.014 | 58 | 2 |

All samples of hydrofinished alcohol on being stabilized showed good decrease of M.O.I. and some improvement of P.T.

Various modifications may be made in the system used for the hydrogenation of the alcohol. The liquid alcohol to be treated may be passed countercurrent to the hydrogen gas when contacting the catalyst, such as reduced finely divided nickel or the like.

An important step in the hydrofinishing operation is the stripping of dissolved hydrogen from the finished alcohol product. This step is important not only for preventing explosion during subsequent handling of the product but also for increasing the purity. The hydrogen stripped from the alcohol may be used in the hydrogenation reactor. The stripping system shown in Fig. 1 may be used. In such a system one or two vessels may be used for stripping the dissolved hydrogen from the alcohol. Compared with processes which employ very high pressure there is a substantial advantage in using lower-pressure mild hydrogenation conditions which then permits stripping of dissolved hydrogen from the finished alcohol at close to atmospheric pressure.

The invention described is claimed as follows:

1. A method of improving the quality of ethyl alcohol prepared by hydrating ethylene which comprises extractively distilling crude ethyl alcohol with water to produce an ethyl alcohol feed having a permanganate time test value of at least 20 minutes and a miscellaneous organic impurities number of not more than about 0.1, contacting said ethyl alcohol with a reduced nickel catalyst at a temperature within the range of 65° to 110° F. and hydrogen pressure between about 0 to 50 p.s.i.g., at a feed rate of at least 5 volumes of alcohol feed per volume of catalyst per hour, the contact time being below about 2.2 hours, fractionally distilling the thus hydrofinished alcohol to remove dissolved hydrogen therefrom and recovering an alcohol product having improved odor qualities, a higher permanganate time test value and a miscellaneous organic impurities concentration not greater than that of the ethyl alcohol feed.

2. The method of improving the quality of ethyl alcohol prepared by hydrating ethylene which comprises extractively distilling with water the ethyl alcohol formed by hydrating ethylene to produce a purified ethyl alcohol product having a permanganate time test value in the range of 20 to 45 minutes and a miscellaneous organic impurities number in the range of 0.015 to 0.1, contacting said purified ethyl alcohol product with a reduced nickel catalyst at a temperature in the range of 65 to 110° F. and with hydrogen under a pressure in the range of 0 to 50 p.s.i.g., and purified ethanol being contacted at a feed rate not less than 2.5 volumes of liquid ethanol per volume of catalyst per hour, the contact time of the liquid ethyl alcohol with the catalyst being kept sufficiently below 2.2 hours so that with improvement in the odor of the alcohol and increase of the permanganate time for the alcohol to within the range of 50 to 60 minutes while the maximum increase for the miscellaneous organic impurities number of the hydrogenated alcohol is kept below 0.075, and thereafter stabilizing the thus hydrofinished ethyl alcohol by fractional distillation under reflux to remove dissolved hydrogen therefrom.

3. A method of improving the quality of ethyl alcohol prepared by hydrating ethylene, which comprises extractively distilling with water the ethyl alcohol formed by hydrating ethylene to form a purified ethyl alcohol product having a permanganate time test value of at least 20 minutes and a miscellaneous organic impurities number in the range of 0.015 to 0.1, contacting the thus purified ethyl alcohol product with a reduced nickel catalyst at a temperature within the range of 65 to 110° F., under a hydrogen pressure in the range of 0 to 50 p.s.i.g. and at a feed rate of not less than 2.5 volumes of liquid ethyl alcohol per volume of catalyst per hour until a maximum of hydrogen consumed amounts to 0.03 gram moles per liter of the alcohol, stopping further reaction of the hydrogen with an alcohol to prevent an increase of the miscellaneous organic impurities as the thus hydrofinished alcohol is given permanganate time in the range of 50 to 60 minutes, and fractionally distilling the thus hydrofinished alcohol to remove dissolved hydrogen therefrom and recover an alcohol product of improved qualities.

References Cited in the file of this patent

UNITED STATES PATENTS

| | | |
|---|---|---|
| Re. 23,507 | Maycock et al. | May 27, 1952 |
| 2,525,354 | Hoog et al. | Oct. 10, 1950 |
| 2,575,556 | Maycock et al. | Nov. 20, 1951 |
| 2,726,199 | Biribauer et al. | Dec. 6, 1955 |

FOREIGN PATENTS

| | | |
|---|---|---|
| 131,478 | Australia | Feb. 22, 1949 |
| 153,306 | Australia | Sept. 22, 1953 |
| 640,180 | Great Britain | July 12, 1950 |